United States Patent [19]

O'Banion

[11] 4,385,443
[45] May 31, 1983

[54] SABRE SAW

[75] Inventor: Michael L. O'Banion, Norwich, Conn.

[73] Assignee: AEG Power Tool Corporation, Norwich, Conn.

[21] Appl. No.: 286,541

[22] Filed: Jul. 24, 1981

[51] Int. Cl.³ .............................................. B27B 11/02
[52] U.S. Cl. ............................................ 30/393; 74/50
[58] Field of Search ........................ 30/392, 393, 394; 74/50

[56] References Cited

U.S. PATENT DOCUMENTS

| 3,204,470 | 9/1965 | Brucker | 74/50 |
| 3,236,111 | 2/1966 | Naslund | 74/50 |
| 3,269,197 | 8/1966 | Enders | 74/50 |
| 3,863,342 | 2/1975 | Griffies | 30/393 |
| 4,137,632 | 2/1979 | Pfanzer | 30/393 |
| 4,238,884 | 12/1980 | Walton | 30/393 |

Primary Examiner—Jimmy C. Peters
Attorney, Agent, or Firm—Michael J. Striker

[57] ABSTRACT

A sabre saw comprises a saw blade connected at its rear end to an elongated saw blade carrier extending in the longitudinal direction of the blade. The carrier is guided for reciprocating movement in a bushing which is mounted in the housing of the sabre saw for pivotal movement about a pivot axis normal to the longitudinal direction of the carrier. A first bevel gear driven by a second bevel gear on the output of an electric motor is rotated about its axis inclined at an acute angle to the longitudinal direction of the carrier and carrying a pin parallel to and laterally spaced from the inclined axis. The pin projects with a free end portion into a yoke fixed to the bottom face of the carrier and at least one spring cooperates with a member fixed to the bushing and projecting rearwardly therefrom substantially parallel to the carrier to maintain the end portion of the pin within the yoke during orbiting of the pin, so that the carrier and the saw blade carried thereon will make during operation of the motor a reciprocating movement in longitudinal direction and a pivotal movement about the pivot axis.

18 Claims, 5 Drawing Figures

SABRE SAW

BACKGROUND OF THE INVENTION

The present invention relates to a sabre saw, and more specifically to a portable power operated sabre saw having a saw blade performing a reciprocating and orbital motion.

Various power operated saws having a saw blade making a reciprocating and orbital motion are known in the art. Such saws are for instance disclosed in the U.S. Pat. Nos. 2,137,893; 2,705,980; 2,793,661; 2,879,815; 3,863,342; 3,971,132; and 3,945,120. A common disadvantage of these known saws is that the mechanism for moving the saw blade along its reciprocating and orbital motion is either rather complicated or contains rather large rotating masses which impart to the saw blade undesired vibrations.

SUMMARY OF THE INVENTION

It is an object of the present invention to provide a portable power-driven sabre saw which avoids the disadvantages of such saws known in the art.

It is a further object of the present invention to provide a portable sabre saw in which the means for moving the saw blade along a reciprocating and orbital motion are of relatively simple construction and of relatively light weight so that the saw may be easily handled by an operator, and the saw blade itself will not be subjected to undue vibrations.

With these and other objects in view, the portable power-driven sabre saw according to the present invention mainly comprises a housing, elongated saw blade means having a rear portion in the housing and a front portion projecting beyond one end of the housing, guide means in the housing mounting the rear portion of the saw blade means for reciprocating movement in longitudinal direction and for pivotal movement about a pivot axis transverse to this longitudinal direction, eccentric means mounted in the housing rotatable about an axis inclined at an acute angle to the this longitudinal direction, means connecting the eccentric means to the saw blade means for reciprocating the latter during rotation of the eccentric means in said longitudinal direction while causing the guide means to pivot about the aforementioned pivot axis, and drive means in the housing for rotating the eccentric means about the inclined axis, whereby during operation of the drive means the saw blade means will carry out a reciprocating movement in longitudinal direction and a pivotal movement about the pivot axis.

The aforementioned saw blade means comprise a saw blade proper having a front portion projecting beyond the one end of the housing and a rear portion in the housing and an elongated saw blade carrier connected to the rear portion of the saw blade and extending substantially in the longitudinal direction of the latter.

The guide means comprises a bushing guiding the saw blade carrier for movement in longitudinal direction and a pin extending transverse to this longitudinal direction and mounting the bushing for pivotal movement about the aforementioned pivot axis.

The eccentric means preferably comprises a gear turnable about the inclined axis and a pin projecting with an end portion thereof toward the carrier and being eccentrically mounted on the gear parallel to the inclined axis, whereas the connecting means preferably comprise a yoke fixed to the saw blade carrier and bearing means turnably mounted on the end portion of the pin and slidingly engaging the yoke. The drive means preferably comprise an electric motor mounted in the housing and having an output shaft and a gear fixed to the output shaft and meshing with the gear which is mounted for rotation about the inclined axis.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
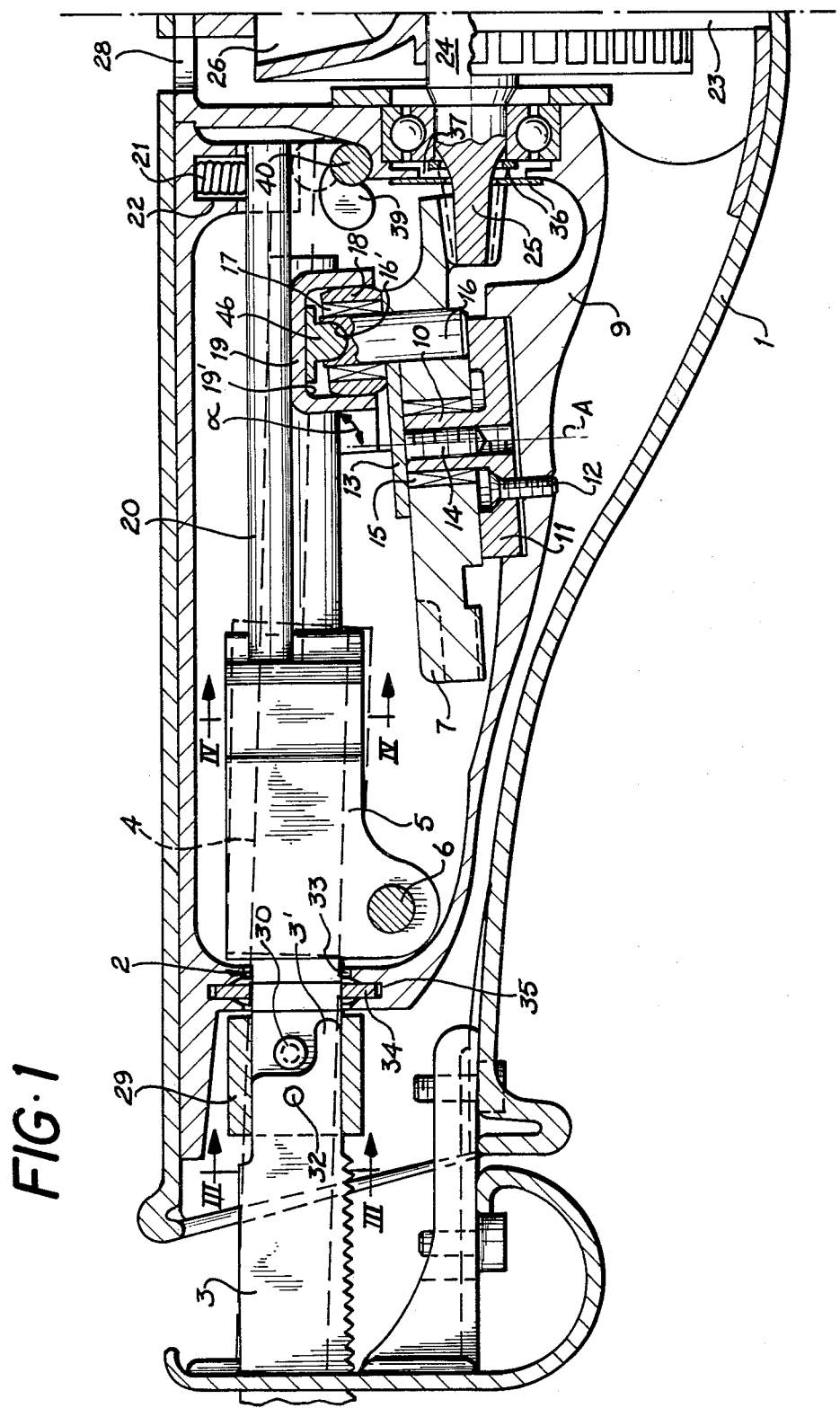
FIG. 1 is a partially sectioned side view of the sabre saw according to the present invention.
Figure 1A:
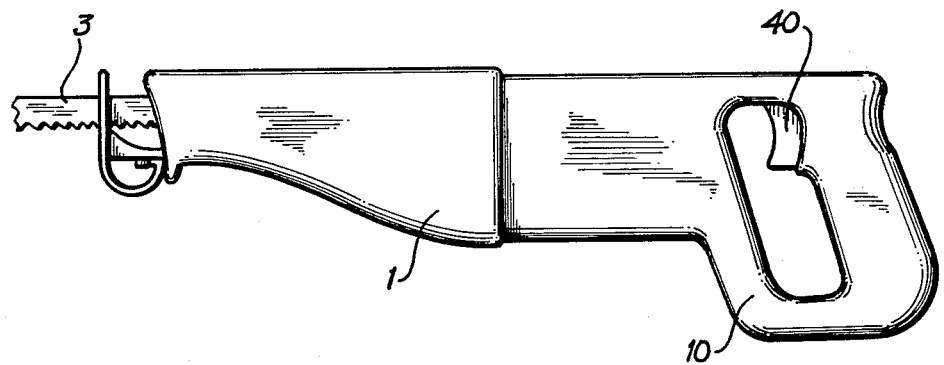
FIG. 1A is a side view of the sabre saw of the present invention.
Figure 2:
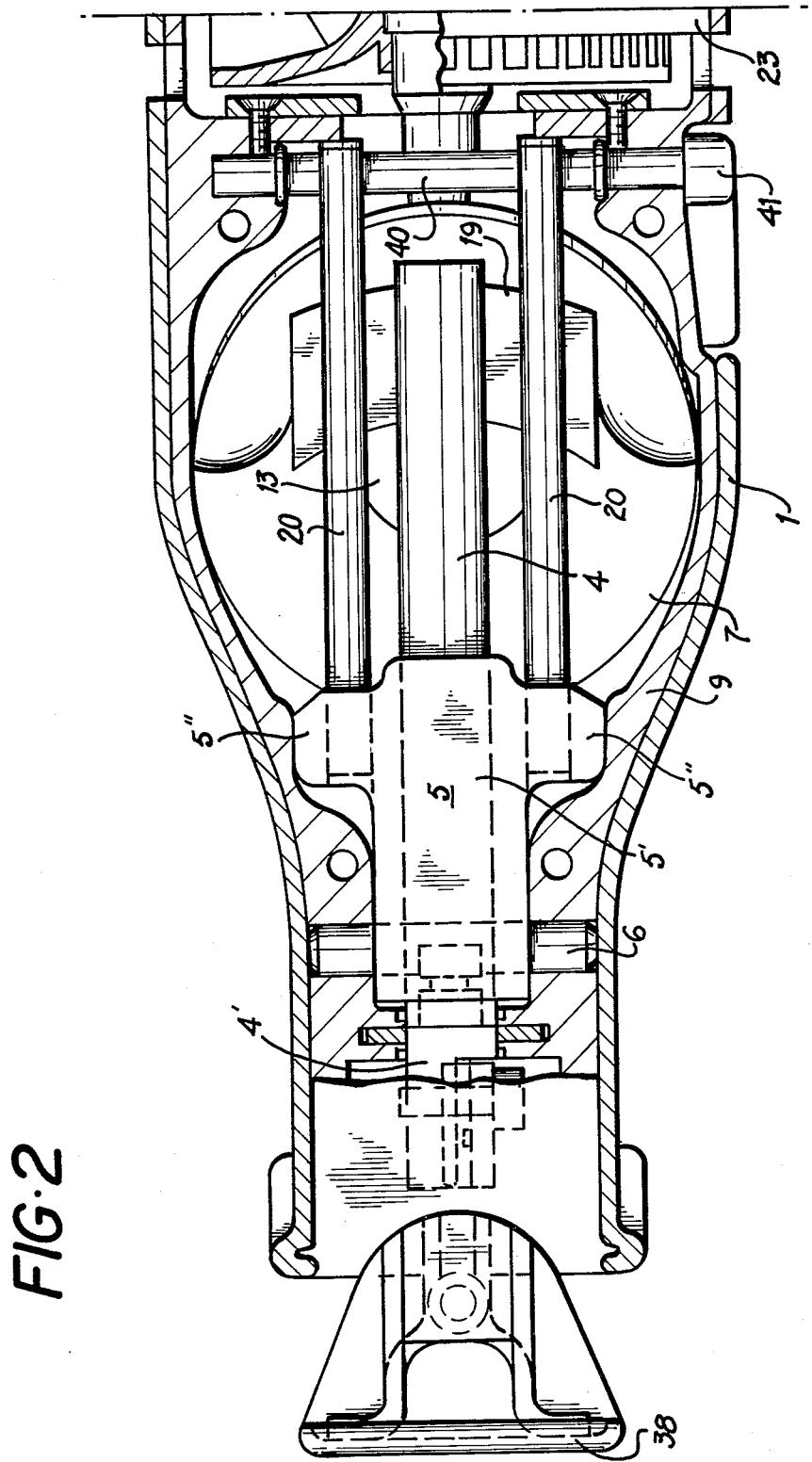
FIG. 2 is a partially sectioned top view thereof.

Referring now to the drawing, and more specifically to FIGS. 1 and 2, it will be seen that the sabre saw according to the present invention comprises a housing 1 and elongated saw blade means 2 comprising a saw blade 3 having a front portion projecting beyond housing 1 and a rear portion in the housing, and an elongated saw blade carrier 4 connected to the rear portion of the saw blade 3 and projecting rearwardly therefrom in the longitudinal direction of the saw blade. The saw blade carrier 4 is guided in an elongate bushing 5 in the housing 1 for movement in longitudinal direction and the bushing 5, in turn, is mounted in the housing 1 for pivotal movement about the axis of a pivot pin 6 extending substantially normal to the elongation of the carrier 4 through a bore formed in a downwardly extending projection 5' of the bushing and with opposite end portions beyond the latter which are mounted in corresponding bores of the housing.

Eccentric means are provided connected to a portion of the carrier 4 projecting rearwardly beyond the bushing 5 for reciprocating the carrier 4 and the saw blade 3 connected thereto in longitudinal direction while permitting the bushing 5 to pivot about the axis of the pivot pin 6. These eccentric means comprise a member in form of a bevel gear 7 mounted in the housing rotatable about an axis A including with the longitudinal direction of the carrier 4, as shown in FIG. 1, in acute angle alpha. The housing comprises an inner grease filled casing 9 and the bevel gear 7 is mounted on a tubular projection 10 coaxial with the inclined axis A and projecting upwardly from a plate 11 mounted by a plurality of screws 12, of which only one is shown in FIG. 1, in a cutout provided in the bottom face of the casing 9. A plate 13 is held in engagement with the top face of the gear 7 by means of a screw 14 screwed into the threaded bore of the tubular projection 10. Preferably the gear 7 is mounted on the projection 10 by means of a needle bearing 15.

The aforementioned eccentric means include further a pin 16 press fitted into a bore of the bevel gear 7 laterally spaced from the inclined axis A and parallel thereto. A needle bearing 17 is mounted on the portion of the pin 16 projecting upwardly beyond the bevel gear 7 and a sleeve 18 is mounted on the needle bearing 17 for rotation about the axis of the pin 16. The sleeve 18 is rotationally and slidingly in direction of its axis in engagement with a U-shaped yoke 19, curved in longitudinal direction, as seen in FIG. 2, and connected, for instance by welding, in a cutout provided in the region of the free end portion of the carrier 4. The upper end of the pin 16 is formed with a semispherical cavity 16' in which a corresponding semispherical portion of a thrust bearing 41 is located which engages the bottom face 19' of the yoke 19.

Biasing means are provided for maintaining the sleeve 17 in engagement with the yoke 19 during rotation of the gear 7 about the inclined axis A. Such biasing means preferably comprise elongated means fixed to the bushing 5 and projecting rearwardly therefrom substantially parallel to the carrier 4. These elongated means may comprise, as shown in the illustrated embodiment, a pair of rods extending transversely spaced from each other parallel to the carrier 4. As best shown in FIG. 2, the left ends, as viewed in this figure, are press fitted into bores respectively provided in portions 5" respectively projecting to opposite sides of the bushing 5, integral therewith. The biasing means further comprise a pair of compression springs 21 lodged in appropriate cutouts 22 of the casing 9 and engaging with the lower ends thereof respectively the rods 20 at the side thereof facing away from the yoke 19.

Drive means are provided for rotating the bevel gear 7 about the inclined axis A. Such drive means preferably comprise an electric motor 23 mounted in a rear portion of the elongated housing 1 and having an output shaft 24 carrying at the free end thereof a bevel gear 25, preferably integral with the output shaft 24, and meshing with the bevel gear 7. The motor 23 is preferably provided with ventillator blades 26 fixed to the output shaft 24 for rotation therewith for blowing cooling air, sucked into the interior of the housing 1 through openings 28, over the motor 23 for cooling the latter.

Figure 4:
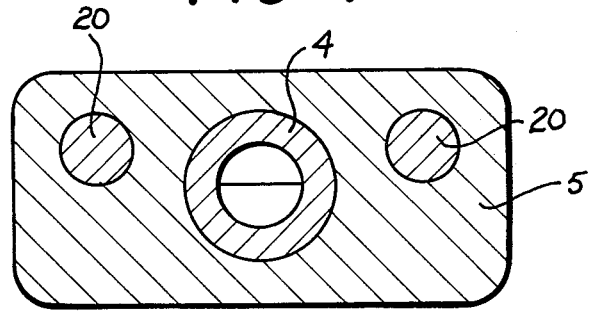
FIG. 4 is a section taken along the line IV—IV of FIG. 1.

The carrier 4 is preferably in the form of a cylindrical tube, as best shown in FIG. 4, and is provided at a front end thereof with a substantially L-shaped portion 4', as best shown in FIG. 2, preferably welded to the front end of the tube 4.

Figure 3:
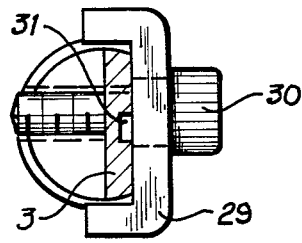
FIG. 3 is a section taken along the line III—III of FIG. 1.

The rear end of the saw blade 3 and a projection 3' thereon overlaps the L-shaped member 4' welded to the front end of the carrier 4 and is fixed to the latter by a C-shaped clamp 29, best shown in FIG. 3, connected to the L-shaped member 4' by a screw 30 passing through a corresponding bore in the clamp 29 upwardly spaced from the projection 3' of the saw blade into a threaded bore of the L-shaped member 4'. A short cylindrical projection 31 projects from the inner surface of the C-shaped clamp 29 into a corresponding bore 32 at the rear end of the saw blade 3, so that the latter is fixedly connected to the carrier 4.

The front end portion of the carrier 4 extends through an opening 33 in the casing 9, sealed by a sealing ring 34 located in an annular groove 35 in the housing 9 and corresponding sealing means 36 are arranged about the opening 37 in the rear wall of the casing 9 through which the bevel gear 25 projects. A guard 38 of standard construction is also connected in the manner as shown in FIG. 1 to the front end of the outer housing 1 for preventing a workpiece to be sawn by the saw blade 3 from engagement with the front end of the housing during reciprocation of the saw blade.

During operation of the saw it is sometimes desired that the saw blade 3 performs only a reciprocating motion in longitudinal direction. For this purpose a pair of cams 39 are provided projecting laterally and transversely spaced from each other from a pin 40 extending parallel to the pin 6 and being turnably mounted in corresponding bores of the casing 9 with an end portion of the pin 40 projecting beyond the casing and carrying a knob 41 so that the pin 40 and the cams 39 projecting therefrom may be turned from the position shown in full line to the position shown in dotted line in FIG. 1, in which latter position the cams 39 will engage the pins 20 on the sides thereof opposite from the sides engaged by the compression springs 21, thereby preventing the guide bushing 5 to pivot about the axis of the pivot pin 6.

The right end of the housing 1 is constructed as a handle portion 1' in which a trigger 40 is arranged, operation of which starts the motor 23.

The operation of the sabre blade according to the present invention will be obvious from the above description of its construction.

When the motor 23 is energized, the bevel gear 25 on the output shaft of the motor will turn the bevel gear 7, rotatable about the inclined axis A, so that the pin 16 will orbit about this axis and the sleeve 18 mounted on the needle bearing on the pin 16 will slidingly and rotatably engage with the yoke 19 to thereby reciprocate the carrier 4 and the saw blade 3 connected thereto in longitudinal direction, while due to the engagement of the saw blade with a workpiece and the action of the compression springs 21, the guide bushing 5 will pivot about the pivot axis of the pin 6, so that the carrier 4 and the saw blade 3 will also make a pivotal movement about the axis of the pivot pin 6. The yoke 19 is held by the action of the compression springs 21 thereby in engagement with the bottom lines of the pins 20 so that the cylindrical carrier 4 is prevented from rotation about its axis. If it is desired that the saw blade 3 and the carrier 4 are moved only in longitudinal direction without also performing a pivotal movement about the axis of the pivot pin 6, the cams 39 are turned from the full line position shown in FIG. 1 to the dotted line position, so that the cams will engage the pins 20 at the side thereof opposite from the sides engaged by the compression springs 21, lifting the yoke 19 upwardly and out of engagement with the thrust bearing 41, preventing thereby the guide bushing 5 to pivot about the axis of the pivot pin 6.

It will be understood that each of the elements described above, or two or more together, may also find a useful application in other types of sabre saws differing from the types described above.

While the invention has been illustrated and described as embodied in a sabre saw in which the saw blade can make a reciprocating movement and a pivotal movement about a pivot axis extending transverse to the longitudinal direction of the saw blade, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A portable sabre saw comprising a housing; elongated saw blade means having a rear portion in said housing and a front portion projecting beyond one end of said housing; guide means in said housing mounting said rear portion of said saw blade means for reciprocating movement in longitudinal direction and for pivotal movement about a pivot axis transverse to said longitudinal direction; eccentric means mounted in said housing rotatable about an axis inclined at an acute angle to said longitudinal direction; means connecting said eccentric means to said saw blade means for reciprocating the latter during rotation of said eccentric means in said longitudinal direction while causing said guide means to pivot about said pivot axis; and drive means in said housing for rotating said eccentric means about said inclined axis, whereby during operation of said drive means said saw blade means will carry out a reciprocating movement in longitudinal direction and a pivotal movement about said pivot axis.

2. A portable sabre saw as defined in claim 1, wherein said eccentric means are connected to said saw blade means rearwardly of said guide means.

3. A portable sabre saw as defined in claim 1, wherein said saw blade means comprises a saw blade having a front portion projecting beyond said one end of said housing and a rear portion in said housing, and an elongated saw blade carrier connected to said rear portion of said saw blade and extending in the longitudinal direction of the latter, said guide means and said eccentric means cooperating with said saw blade carrier.

4. A portable sabre saw as defined in claim 3, wherein said guide means comprises a bushing guiding said saw blade carrier for movement in longitudinal direction, and including a pin extending transverse to said longitudinal direction and mounting said bushing for pivotal movement about said pivot axis.

5. A portable sabre saw as defined in claim 4, wherein said eccentric means comprises a member rotatable about said inclined axis, a pin projecting with an end portion thereof toward said carrier and being eccentrically mounted on said member parallel to said inclined axis, said drive means rotating said member about said inclined axis.

6. A portable sabre saw as defined in claim 5, wherein said connecting means comprises a yoke fixed to said saw blade carrier and bearing means turnably mounted on said end portion of said pin and slidably engaging said yoke.

7. A portable sabre saw as defined in claim 6, and including biasing means for maintaining said projecting portion of said pin within said yoke during pivotal movement of said saw blade means about said pivot axis.

8. A portable sabre saw as defined in claim 7, wherein said biasing means comprise elongated means fixed to said bushing and projecting rearwardly therefrom substantially parallel to said saw blade carrier and spring means for biasing said elongated means toward a free end of said pin.

9. A portable sabre saw as defined in claim 8, wherein said elongated means comprise a pair of transversely spaced rods and wherein said spring means comprises a pair of compression springs respectively engaging said rods in the region of the rear ends of the latter and at the sides thereof facing away from said yoke.

10. A portable sabre saw as defined in claim 5, wherein said rotatable member is a gear and wherein said drive means is an electric motor mounted in said housing and having an output shaft and a gear fixed to said output shaft and meshing with said first-mentioned gear.

11. A portable sabre saw as defined in claim 10, wherein said gears are bevel gears and wherein said gear on said output shaft is integral with the latter.

12. A portable sabre saw as defined in claim 1, and including means mounted in said housing movable between an active and inactive position for preventing in said active position pivotal movement of said guide means about said pivot axis so that said saw blade means will make only a reciprocating movement.

13. A portable sabre saw as defined in claim 8, and including cam means mounted in said housing movable between an inactive position disengaged from said elongated means and an active position in which said spring means maintains said elongated means in engagement with said cam means preventing thereby said bushing to pivot about said pivot axis so that said saw blade means will make only a reciprocating movement.

14. A portable sabre saw as defined in claim 13, wherein said cam means is mounted in said housing pivotable about an axis parallel to said pivot axis.

15. A portable sabre saw as defined in claim 10, wherein said housing comprises in the region of the other end thereof a handle portion and switch means on said handle portion for starting and stopping said motor.

16. A portable sabre saw as defined in claim 10, and including an inner grease filled casing in said housing in which said guide means, said gear with said eccentric pin and said gear on said output shaft are located, said saw blade carrier projecting in a sealed manner through a front end of said casing and said output shaft projecting in a sealed manner through a rear end of said casing.

17. A portable sabre saw as defined in claim 6, and including a thrust bearing mounted on said end portion of said pin and engaging said yoke.

18. A portable sabre saw as defined in claim 17, wherein said thrust bearing has a semispherical portion located in a corresponding semispherical cavity provided at the end of said pin opposite said member.

* * * * *